United States Patent
Rowell et al.

(10) Patent No.: US 12,361,028 B2
(45) Date of Patent: Jul. 15, 2025

(54) DYNAMIC GENERATION AND DEPLOYMENT OF A CONTAINER GROUP SPECIFICATION THAT MATCHES A TAINT

(71) Applicant: Charter Communications Operating, LLC, St. Louis, MO (US)

(72) Inventors: Jeffrey Rowell, Aurora, CO (US); Charles Manser, Clearwater, FL (US)

(73) Assignee: Charter Communications Operating, LLC, St. Louis, MO (US)

( * ) Notice: Subject to any disclaimer, the term of this patent is extended or adjusted under 35 U.S.C. 154(b) by 119 days.

(21) Appl. No.: 17/993,492

(22) Filed: Nov. 23, 2022

(65) Prior Publication Data

US 2024/0168976 A1 May 23, 2024

(51) Int. Cl.
*G06F 16/28* (2019.01)

(52) U.S. Cl.
CPC .................... *G06F 16/285* (2019.01)

(58) Field of Classification Search
CPC ........................................ G06F 16/28
See application file for complete search history.

(56) References Cited

U.S. PATENT DOCUMENTS

| | | | |
|---|---|---|---|
| 9,535,750 B1 * | 1/2017 | Wilkes | G06F 9/4881 |
| 2023/0259409 A1 * | 8/2023 | Shi | G06F 9/5077 |
| | | | 718/104 |

FOREIGN PATENT DOCUMENTS

CN             115185697 A    * 10/2022

* cited by examiner

*Primary Examiner* — Maher N Algibhah
(74) *Attorney, Agent, or Firm* — Dority & Manning, P.A.

(57) ABSTRACT

A set of computing nodes that compose a container orchestration computing cluster are identified. A set of taints that are associated with the set of computing nodes are identified, wherein each taint in the set of taints prohibits scheduling of a container group, which is defined by a container group specification that does not meet a condition defined by the taint, on a computing node associated with the taint. A first container group specification that meets the condition defined by each taint is generated, wherein the first container group specification identifies a container image. The container group, via the first container group specification, is caused to be deployed on each computing node in the set of computing nodes that has an associated taint.

17 Claims, 5 Drawing Sheets

```
62
APIVERSION: APPS/V1
KIND: DAEMONSET
METADATA:
  NAME: SECAPP-DS
  NAMESPACE: SECAPP
SPEC:
  SELECTOR:
    MATCHLABELS:
      APP: SECAPP-DEFENDER
  TEMPLATE:
    METADATA:
      ANNOTATIONS:
        CONTAINER.APPARMOR.SECURITY.BETA.KUBERNETES.IO/
          SECAPP-DEFENDER: UNCONFINED
      LABELS:
        APP: SECAPP-DEFENDER
    SPEC:
      SERVICEACCOUNTNAME: SECAPP-SERVICE
      TOLERATIONS:
      {% FOR TAINT IN DISCOVERED_TAINTS %}       ⎫
        - OPERATOR: "EQUAL"                      ⎪
          KEY: "{{ TAINT.KEY }}"                 ⎬ 74
          VALUE: "{{ TAINT.VALUE }}"             ⎪
      {% ENDFOR %}                               ⎭   ⎫
      RESTARTPOLICY: ALWAYS                          ⎬ 72
      CONTAINERS:                                    ⎪
        - NAME: SECAPP-DEFENDER                      ⎭
      ...
```

```
58
APIVERSION: APPS/V1
KIND: DAEMONSET
METADATA:
  NAME: SECAPP-DS
  NAMESPACE: SECAPP
SPEC:
  SELECTOR:
    MATCHLABELS:
      APP: SECAPP-DEFENDER
  TEMPLATE:
    METADATA:
      ANNOTATIONS:
        CONTAINER.APPARMOR.SECURITY.BETA.KUBERNETES.IO/
          SECAPP-DEFENDER: UNCONFINED
      LABELS:
        APP: SECAPP-DEFENDER
    SPEC:
      SERVICEACCOUNTNAME: SECAPP-SERVICE
      TOLERATIONS:                          ⎫
        - OPERATOR: "EQUAL"                 ⎪
          KEY: "KEY1"                       ⎪
          VALUE: "VALUE1"                   ⎪
        - OPERATOR: "EQUAL"                 ⎪
          KEY: "KEY2"                       ⎬ 78
          VALUE: "VALUE2"                   ⎪
        - OPERATOR: "EQUAL"                 ⎪
          KEY: "HR"                         ⎪
          VALUE: "HRVAL"                    ⎪
        - OPERATOR: "EQUAL"                 ⎪
          KEY: "TAX"                        ⎪
          VALUE: "TAXVAL"                   ⎭   ⎫
      RESTARTPOLICY: ALWAYS                     ⎬ 76
      CONTAINERS:                               ⎪
        - NAME: SECAPP-DEFENDER                 ⎭
      ...
```

DYNAMIC GENERATION AND DEPLOYMENT OF A CONTAINER GROUP SPECIFICATION THAT MATCHES A TAINT

BACKGROUND

Cluster computing environments include a set of computing nodes onto which processes may be initiated. Some cluster computing environments implement a taint mechanism that prohibits the execution of a process on a computing node unless a predefined condition is met.

SUMMARY

The embodiments disclosed herein implement dynamic generation and deployment of a container group specification that matches a taint to facilitate the deployment of a container group on each respective computing node of a container orchestration computing cluster irrespective of the taints associated with the respective computing node.

In one embodiment a method is provided. The method includes identifying, by a computing node, a set of computing nodes that compose a container orchestration computing cluster. The method further includes identifying, by the computing node, a set of taints that are associated with the set of computing nodes, wherein each taint in the set of taints prohibits scheduling of a container group which is defined by a container group specification that does not meet a condition defined by the taint on a computing node associated with the taint. The method further includes generating, by the computing node, a first container group specification that meets the condition defined by each taint, wherein the first container group specification identifies a container image. The method further includes causing, by the computing node and via the first container group specification, the container group to be deployed on each computing node in the set of computing nodes that has an associated taint.

In another embodiment a computing node is provided. The computing node includes a memory and a processor device coupled to the memory. The processor device is configured to identify a set of computing nodes that compose a container orchestration computing cluster. The processor device is further configured to identify a set of taints that are associated with the set of computing nodes, wherein each taint in the set of taints prohibits scheduling of a container group which is defined by a container group specification that does not meet a condition defined by the taint on a computing node associated with the taint. The processor device is further configured to generate a first container group specification that meets the condition defined by each taint, wherein the first container group specification identifies a container image. The processor device is further configured to cause, via the first container group specification, the container group to be deployed on each computing node in the set of computing nodes that has an associated taint.

In another embodiment a non-transitory computer-readable storage medium is provided. The non-transitory computer-readable storage medium includes executable instructions configured to cause a processor device to identify a set of computing nodes that compose a container orchestration computing cluster. The instructions are further configured to cause the processor device to identify a set of taints that are associated with the set of computing nodes, wherein each taint in the set of taints prohibits scheduling of a container group which is defined by a container group specification that does not meet a condition defined by the taint on a computing node associated with the taint. The instructions are further configured to cause the processor device to generate a first container group specification that meets the condition defined by each taint, wherein the first container group specification identifies a container image. The instructions are further configured to cause the processor device to cause, via the first container group specification, the container group to be deployed on each computing node in the set of computing nodes that has an associated taint.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context.

Kubernetes, available at Kubernetes.io, is a cluster-based container orchestration system that implements containers via a container group, referred to as a pod. A container group can comprise one or more containers. A container group is defined by a container group specification (referred to in Kubernetes as a "Pod manifest" or a "Pod specification"). A container group specification may identify one or more container images that are to be scheduled and executed as part of the container group.

Kubernetes utilizes a plurality of computing nodes (sometimes referred to as "nodes" or "worker nodes"), such as virtual machines and/or bare metal machines, on which container groups can be deployed. The term "container" as used herein, refers to a running instance of a container image that is initiated by a container runtime, such as CRI-O or containerd. The phrase "container image" as used herein refers to a static package of software comprising one or more layers, the layers including everything needed to run an application (i.e., as a container) that is initiated from the container image, including, for example, one or more of executable runtime code, system tools, system libraries and configuration settings. A Docker® image is an example of a container image.

A "taint" in Kubernetes is a configurable property associated with a computing node that may be used to repel the scheduling of a container group on that particular computing node. A computing node may be configured with a taint, for example, to limit the scheduling of container groups on that computing node to only certain container groups. This may be useful, for example, to ensure that certain computing nodes, such as computing nodes executing key control plane components of Kubernetes, are not competing for computing resources with container groups associated with users. Such user container groups may then be deployed on computing nodes that do not have key control plane components.

In order for a container group to be scheduled on a computing node that has a taint, the container group specification that defines the container group must have a "toleration" that matches the taint. The taint and toleration may comprise, for example, a key/value pair. If a container group specification does not include a toleration that matches the taint, the container group will not be scheduled on the computing node.

While taints and tolerations implement an important mechanism of controlling the scheduling of container groups on particular computing nodes, there are situations in which it may be desirable to schedule a container group on all computing nodes, irrespective of what taints a computing node may have. One such situation is that of scheduling and running security containers that implement security features on all the computing nodes of a container cluster. For example, it may be desirable to schedule and run a security container that searches for viruses, known malicious containers, undesirable network communications, or the like on each of the computing nodes of a container cluster to ensure that a malicious actor does not breach the computing node.

The embodiments disclosed herein implement dynamic generation and deployment of a container group specification that matches a taint to facilitate the deployment of a container group on each respective computing node of a container orchestration computing cluster irrespective of the taints associated with the respective computing node.

Figure 1A:
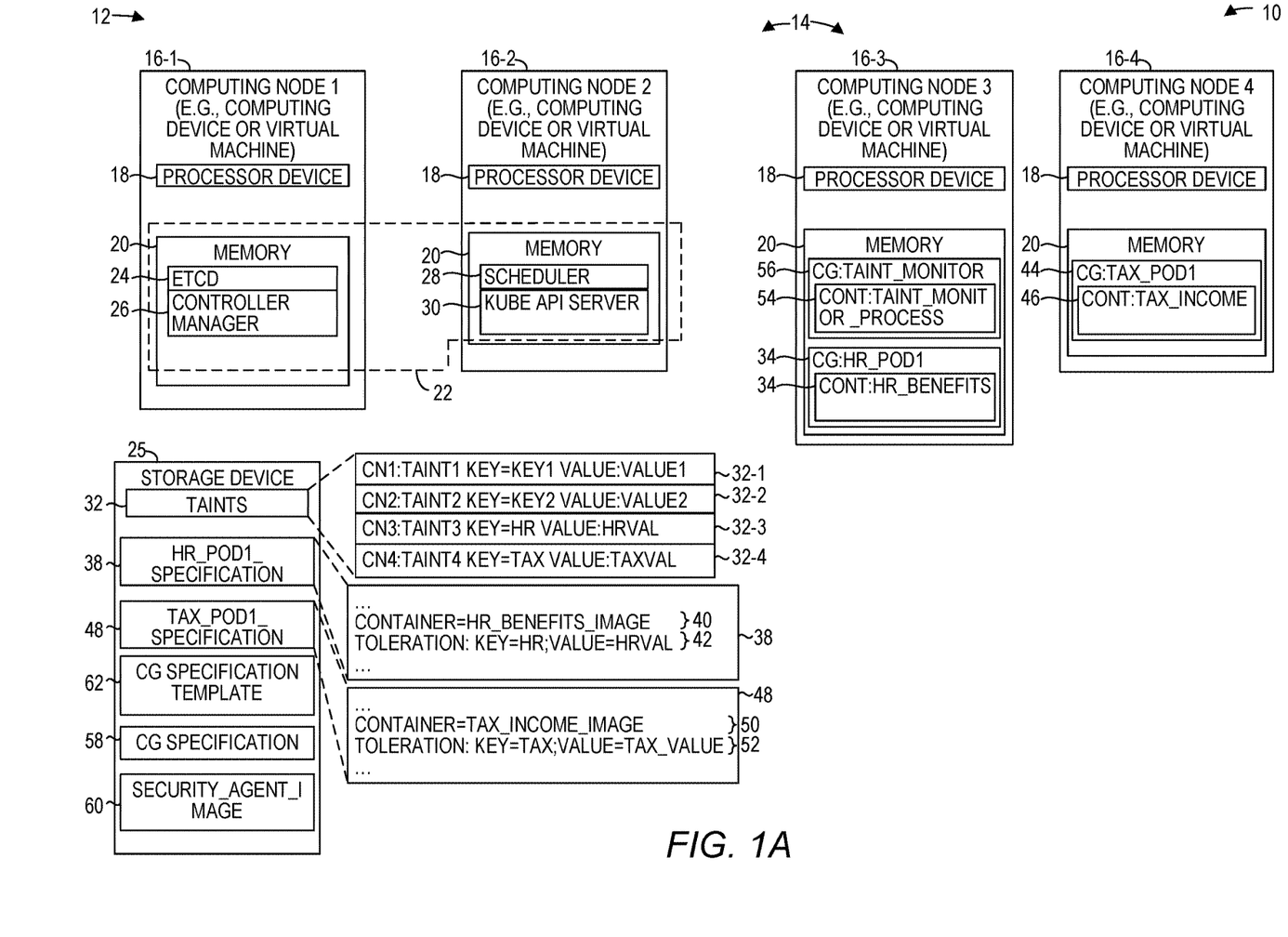
FIGS. 1A-1B are block diagrams of an environment, at two different points in time, suitable for dynamic generation and deployment of a container group specification that matches a taint according to one embodiment.
Figure 1B:
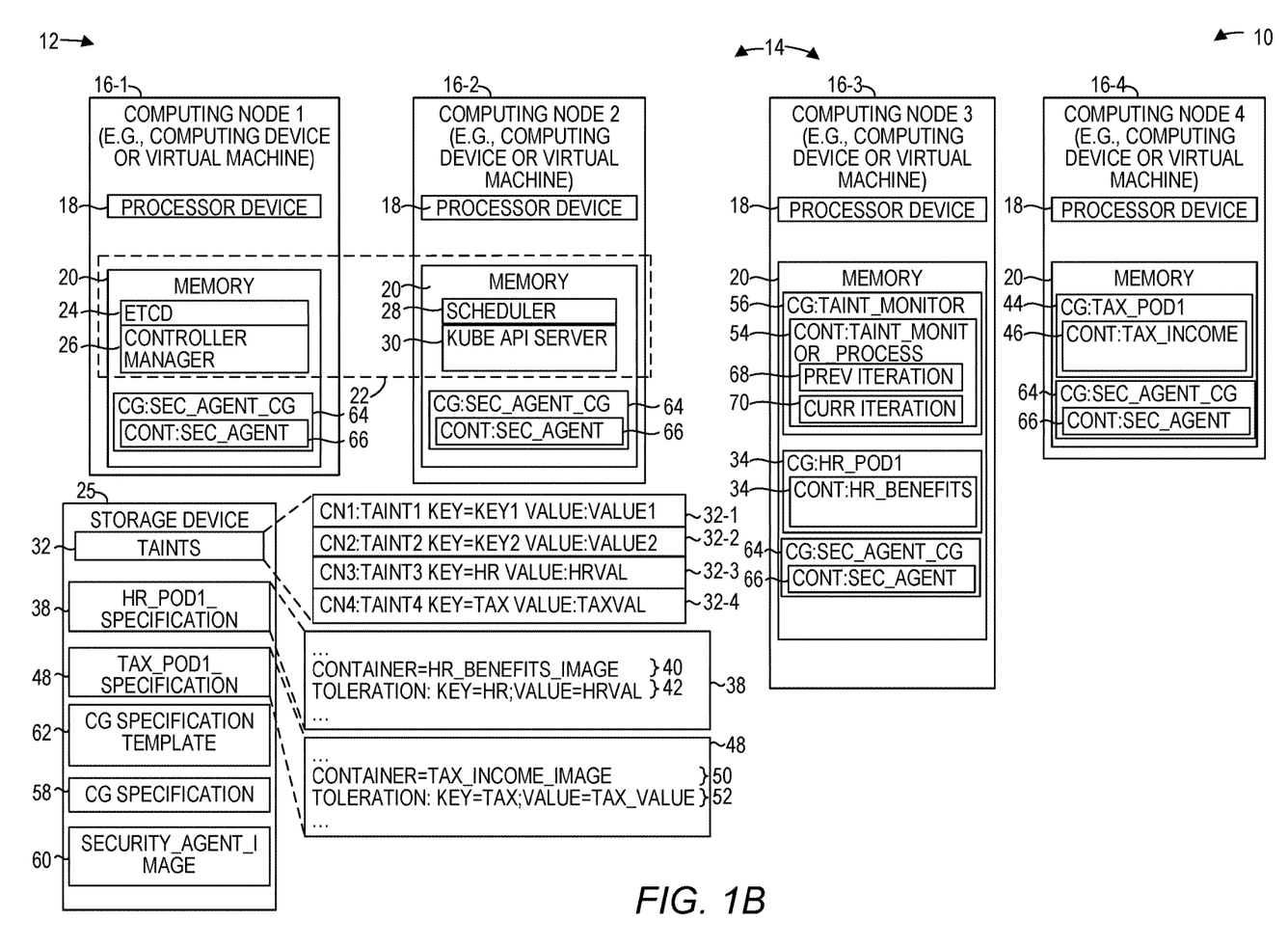

FIGS. 1A-1B are block diagrams of an environment, at two different points in time, suitable for dynamic generation and deployment of a container group specification that matches a taint according to one embodiment. Referring first to FIG. 1A, the environment 10 includes a container orchestration system 12 that is configured to deploy, manage and scale container groups. The container orchestration system 12 includes a container orchestration computing cluster 14, which in this case comprises four computing nodes 16-1-16-4 (generally, computing nodes 16), but which, in practice, may comprise tens, hundreds or thousands of computing nodes. Each computing node 16 may comprise a virtual machine or a bare metal machine. The computing nodes 16 each have one or more virtual (implemented via physical processor devices) or actual processor devices 18 and memories 20.

In some examples the container orchestration system 12 comprises the Kubernetes container orchestration system and implements a Kubernetes container orchestration computing cluster, however, the embodiments disclosed herein are not limited to any particular container orchestration system and applies to any container orchestration system wherein a computing node can be associated with data that must be matched by a container group specification prior to scheduling a container group via the container group specification on the computing node.

The container orchestration system 12 implements a control plane 22 that comprises a plurality of control plane components. In this example, the control plane 22 includes an ETCD 24 control plane component that is a distributed key-value store that provides a mechanism for storing data. While the ETCD 24 is illustrated as being implemented in the memory 20, all or a portion of the ETCD 24 may also be implemented on non-transitory storage, such as on a storage device 25. The control plane 22 includes a controller manager 26 control plane component that monitors the shared state of the container orchestration computing cluster 14 and makes changes attempting to move the current state of the container orchestration computing cluster 14 to the desired state. The control plane 22 includes a scheduler 28 control plane component that assigns pods to the worker nodes 14. The control plane 22 includes a Kube application programming interface (API) server 30 control plane component that exposes various functions of the container orchestration system 12 to other programs, such as an operator command line interface front end, and the like.

The container orchestration computing cluster 14 has four taints 32-1-32-4 (generally, taints 32). Each taint 32 is associated with a particular computing node 16, and thus each computing node 16 may be referred to as "having" a taint 32 or corresponding to a particular taint 32. Each taint 32 is a configurable property associated with a computing node 16. While for purposes of illustration each computing node 16 has one corresponding taint 32, in practice, a computing node 16 may have any number of taints 32, including no taints 32.

Each taint 32 prohibits the scheduling of a container group via a container group specification on that computing node 16 that does not meet a condition defined by the taint 32. In particular, a control plane component, such as the scheduler 28, may analyze a control group specification and a taint 32 that is associated with a particular computing node 16 to determine if the control group specification matches the condition defined by the taint 32. If so, the scheduler 28 may schedule a control group identified in the control group specification for execution on the particular computing node 16. If the control group specification does not match the condition defined by the taint 32, the scheduler 28 will prohibit the scheduling of a control group identified in the control group specification for execution on the particular computing node 16.

In this example the taint 32-1 is associated with the computing node 16-1 and identifies a condition based on a key/value pair. For a container group to be scheduled on the computing node 16-1, the container group specification that defines the container group must have a toleration that matches the key/value pair. In this example, the key/value pair has values of KEY1 and VALUE1. The taint 32-2 is associated with the computing node 16-2 and the key/value pair has values of KEY2 and VALUE2. The taint 32-3 is associated with the computing node 16-3 and the key/value pair has values of HR and HRVAL. The taint 32-4 is associated with the computing node 16-4 and the key/value pair has values of TAX and TAXVAL.

A container group 34 that includes a container 36 is running on the computing node 16-3. The container group 34 is defined by a container group specification 38 that identifies a container image 40 that contains the programming instructions for the running container 36, and contains a toleration 42 that matches the taint 32-3. A container group 44 that includes a container 46 is running on the computing node 16-4. The container group 44 is defined by a container group specification 48 that identifies a container image 50 that contains the programming instructions for the running container 46, and contains a toleration 52 that matches the taint 32-4.

The embodiments may be implemented, at least in part, by a taint monitor 54 that, in this example, executes in a container group 56. Although not illustrated, the container group specification that defines the container group 56 contains a toleration that matches the taint 32-3. The taint monitor 54 identifies the set of computing nodes 16-1-16-4 that compose the container orchestration computing cluster 14 and identifies the set of taints 32-1-32-4 that are associated with the set of computing nodes 16-1-16-4. The taint monitor 54 may then generate a container group specification 58 that identifies a container image 60 and that meets the conditions defined by the taints 32-1-32-4. In some embodiments, the taint monitor 54 may generate the container group specification 58 by modifying a container group specification template 62 that identifies the container image 60.

Referring now to FIG. 1B, the taint monitor 54 may then cause a container group 64 to be deployed on each of the computing nodes 16-1-16-4 to cause the security agent container image 60 to be initiated as a security agent container 66 on each of the computing nodes 16-1-16-4. For example, the taint monitor 54 may submit, to the container orchestration system 12, the container group specification 58 to cause the container orchestration system 12 to deploy the container group 64 on each respective computing node 16. The particular mechanism for causing deployment may differ depending on the particular container orchestration system 12. The term "deploy" in this context means causing the container group 64 to be run on the computing nodes 16 such that the security agent 66 runs on each of the computing nodes 16.

The taint monitor 54 may identify the set of computing nodes 16-1-16-4 that compose the container orchestration computing cluster 14 by issuing a request to the container orchestration system 12 that requests a list of computing nodes 16. While the specific request may vary depending on the particular container orchestration system 12, in one embodiment, a request such as f"{args.api_url}/v3/nodes/?clusterId={args.cluster_id}" may be submitted to the Kube API server 30 to obtain the list of computing nodes 16-1-16-4.

The taint monitor 54 may then identify the set of taints 32-1-32-4 that are associated with the set of computing nodes 16-1-16-4 by issuing a request to the container orchestration system 12 that requests a list of all the taints 32 associated with each computing node 16 identified in the request discussed above. While the specific request may vary depending on the particular container orchestration system 12, in one embodiment, a request such as f"{args.api_url}/v3/nodes/{node_id}" may then be issued for each respective computing node 16 to obtain the taints 32 associated with the respective computing node 16. The taint monitor 54 may then parse through the responses to identify, for each taint 32, the corresponding key and value of the taint 32.

Subsequent to causing the container group 64 to be deployed on each computing node 16, the taint monitor 54 may query the container orchestration system 12 for a list of all container groups executing on each respective computing node 16. The taint monitor 54 receives a response that identifies the container groups executing on each of the computing nodes 16. The taint monitor 54 may then, based on the response, determine that the container group 64 is executing on each computing node 16. If the taint monitor 54 determines that the container group 64 is not executing on a particular computing node 16, the taint monitor 54 may again attempt to cause the container group 64 to be deployed on the computing node 16.

The taint monitor 54 may perform this process iteratively to ensure that when new taints 32 are associated with computing nodes 16 such new taints 32 are added to the container group specification 58 and redeployed. Moreover, the iterative processing will identify when new computing nodes 16 are added to the container orchestration computing cluster 14 and thus need to have the container group 64 deployed to such new computing nodes 16. In one embodiment, the taint monitor may perform the process periodically, such as every five minutes, every ten minutes, every hour, or any other suitable period of time.

After an iteration, the taint monitor 54 may populate a previous iteration list 68 with all taints 32 and corresponding conditions, and all the computing nodes 16 identified during that iteration. At the next iteration, the taint monitor 54 may populate a current iteration list 70 that identifies all taints 32 and corresponding conditions, and all the computing nodes 16 identified during that iteration. The taint monitor 54 may compare the current iteration list 70 to the previous iteration list 68. If the current iteration list 70 identifies a new taint 32 that is not identified in the previous iteration list 68, or identifies a new computing node 16 that is not identified in the previous iteration list 68, the taint monitor 54 may modify the container group specification template 62 to generate a new container group specification 58 that includes the new taint 32 and/or new computing node 16, and use the container group specification 58 to cause the container group 64 to be deployed on the computing nodes 16, including the new computing node 16. If the container group 64 is already deployed on a computing node 16, the container orchestration system 12 may simply disregard the request to deploy the container group 64 on that computing node 16. In some implementations, the deployment may be facilitated via a Kubernetes resource, such as a daemonset.

The taint monitor 54 may then copy the current iteration list 70 to the previous iteration list 68, and repeat the process at the next periodic interval. In this manner, the taint monitor 54 can ensure that the security agent container 66 is deployed on all computing nodes 16 irrespective of the addition of new taints 32 or the introduction of new computing nodes 16 to the container orchestration computing cluster 14.

It is noted that, because the taint monitor 54 is a component of the computing node 16-3, functionality implemented by the taint monitor 54 may be attributed to the computing node 16-3 generally. Moreover, in examples where the taint monitor 54 comprises software instructions that program the processor device 18 to carry out functionality discussed herein, functionality implemented by the taint monitor 54 may be attributed herein to the processor device 18.

Figure 2:
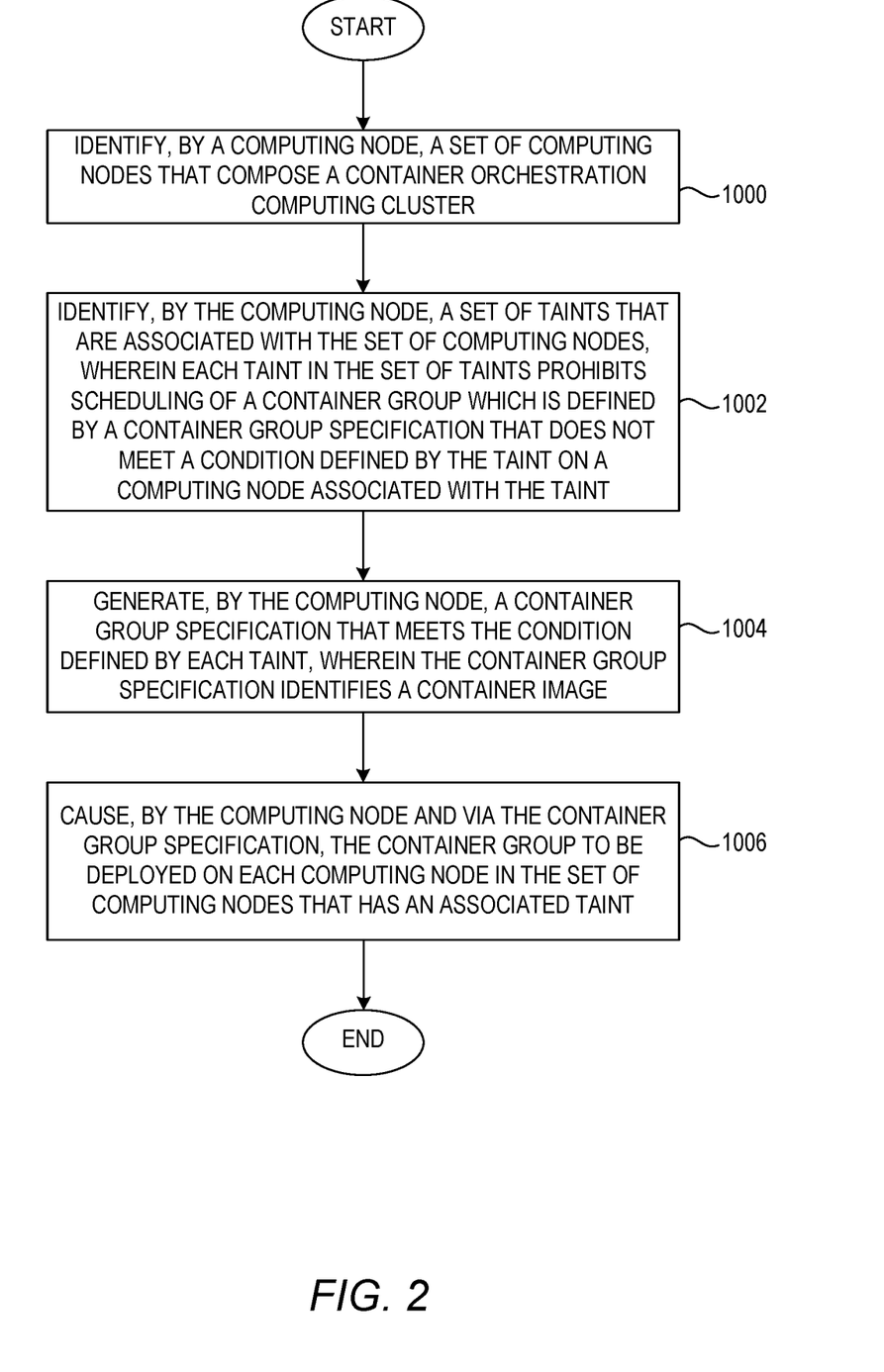
FIG. 2 is a flowchart of a method for dynamic generation and deployment of a container group specification that matches a taint according to one embodiment.

FIG. 2 is a flowchart of a method for dynamic generation and deployment of a container group specification that matches a taint according to one embodiment. FIG. 2 will be discussed in conjunction with FIG. 1. The computing node 16-3 identifies the set of computing nodes 16-1-16-4 that compose the container orchestration computing cluster 14 (FIG. 2, block 1000). The computing node 16-3 identifies the set of taints 32-1-32-4 that are associated with the set of computing nodes 16-1-16-4, wherein each taint 32 in the set of taints 32 prohibits scheduling of a container group that is defined by a container group specification that does not meet a condition defined by the taint 32 on a computing node associated with the taint (FIG. 2, block 1002). The computing node 16-3 generates the container group specification 58 that meets the condition defined by each taint 32, wherein the container group specification 58 identifies the container image 60 (FIG. 2, block 1004). The computing node 16-3 causes, via the container group specification 58, the container group 64 to be deployed on each computing node 16-1-16-3 in the set of computing nodes 16-1-16-3 that has an associated taint 32 (FIG. 2, block 1006).

Figure 3:
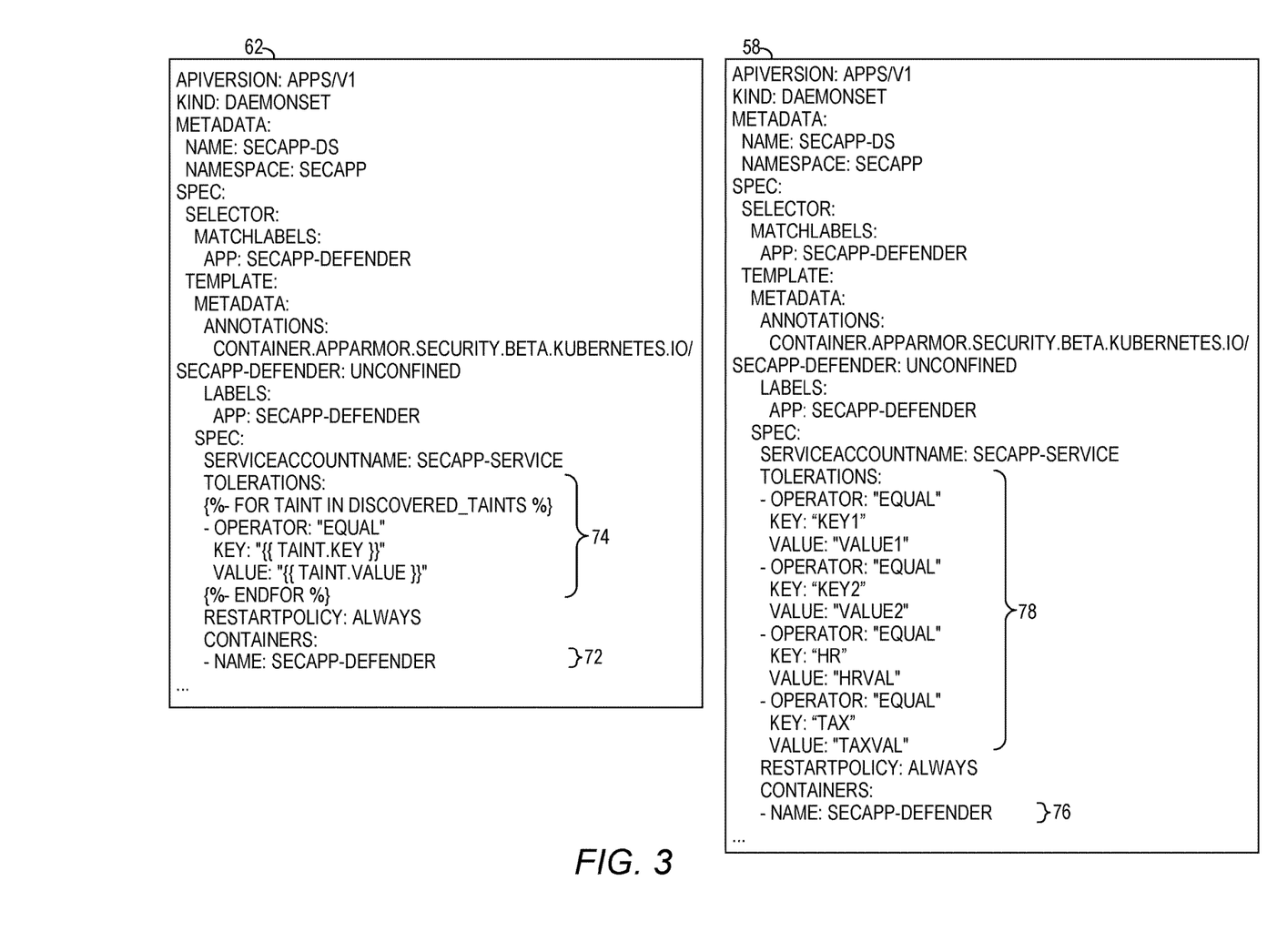
FIG. 3 illustrates a container group template specification and a generated container group specification according to one embodiment.

FIG. 3 illustrates a container group specification template 62 and the generated container group specification 58 according to one embodiment. In this example, the container group specification template 62 and the generated container group specification 58 are generated for a Kubernetes-based container orchestration system. The container group specification template 62 contains a section 72 that identifies the container image 60, and a section 74 where the appropriate taints 32 will be identified after the taint monitor 54 identifies the taints 32-1-32-4. The container group specification 58 contain a section 76 that identifies the container image 60, and a section 78 where the taint monitor 54 has modified the section 74 of the container group specification template 62 to identify the taints 32-1-32-4.

Figure 4:
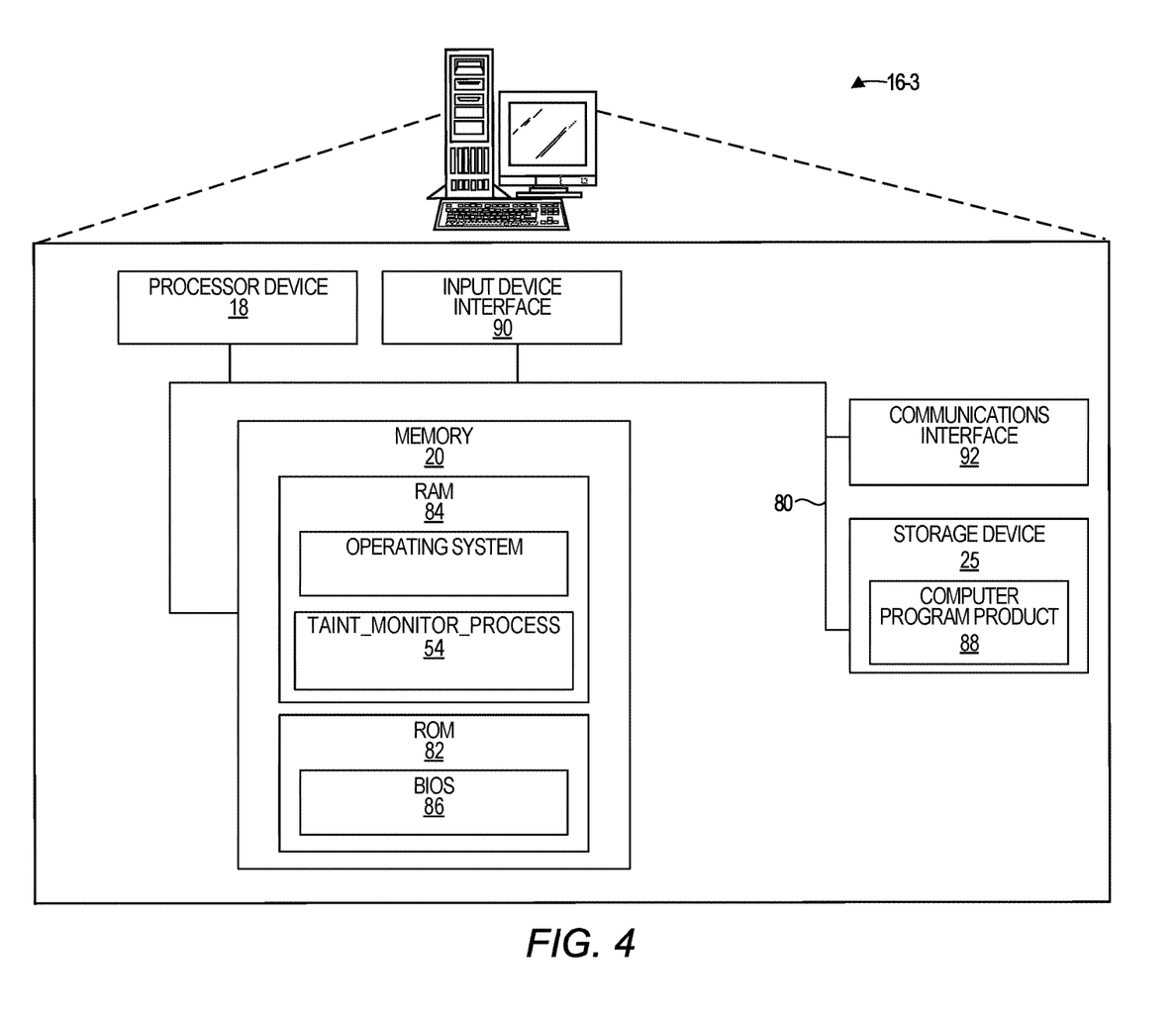
FIG. 4 is a block diagram of a computing node capable of implementing the embodiments disclosed herein.

FIG. 4 is a block diagram of the computing node 16-3 suitable for implementing examples according to one example. The computing node 16-3 may comprise any computing or electronic device capable of including firmware, hardware, and/or executing software instructions to implement the functionality described herein, such as a computer server, a desktop computing device, a laptop computing device, or the like. The computing node 16-3 may be a bare metal machine or a virtual machine implemented on a bare metal machine. The computing node 16-3 includes the processor device 18, the memory 20, and a system bus 80. The system bus 80 provides an interface for system components including, but not limited to, the memory 20 and the processor device 18. The processor device 18 can be any commercially available or proprietary processor.

The system bus 80 may be any of several types of bus structures that may further interconnect to a memory bus (with or without a memory controller), a peripheral bus, and/or a local bus using any of a variety of commercially available bus architectures. The memory 20 may include non-volatile memory 82 (e.g., read-only memory (ROM), erasable programmable read-only memory (EPROM), electrically erasable programmable read-only memory (EEPROM), etc.), and volatile memory 84 (e.g., random-access memory (RAM)). A basic input/output system (BIOS) 86 may be stored in the non-volatile memory 82 and can include the basic routines that help to transfer information between elements within the computing node 16-3. The volatile memory 84 may also include a high-speed RAM, such as static RAM, for caching data.

The computing node 16-3 may further include or be coupled to a non-transitory computer-readable storage medium such as the storage device 25, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 25 and other drives associated with computer-readable media and computer-usable media may provide non-volatile storage of data, data structures, computer-executable instructions, and the like.

A number of modules can be stored in the storage device 25 and in the volatile memory 84, including an operating system and one or more program modules, such as the taint monitor 54, which may implement the functionality described herein in whole or in part. All or a portion of the examples may be implemented as a computer program product 88 stored on a transitory or non-transitory computer-usable or computer-readable storage medium, such as the storage device 25, which includes complex programming instructions, such as complex computer-readable program code, to cause the processor device 18 to carry out the steps described herein. Thus, the computer-readable program code can comprise software instructions for implementing the functionality of the examples described herein when executed on the processor device 18. The processor device 18, in conjunction with the taint monitor 54 in the volatile memory 84, may serve as a controller, or control system, for the computing node 16-3 that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the processor device 18 through an input device interface 90 that is coupled to the system bus 80 but can be connected by other interfaces such as a parallel port, an Institute of Electrical and Electronic Engineers (IEEE) 1394 serial port, a Universal Serial Bus (USB) port, an IR interface, and the like. The computing node 16-3 may also include a communications interface 92 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
    identifying, by a computing node, a set of computing nodes that compose a container orchestration computing cluster;
    identifying, by the computing node, a set of taints that are associated with the set of computing nodes, wherein each taint in the set of taints prohibits scheduling of a container group which is defined by a container group specification that does not meet a condition defined by the taint on a computing node associated with the taint;
    based on the set of taints, generating, by the computing node, a first container group specification that meets the condition defined by each taint, wherein the first container group specification identifies a container image, wherein generating the first container group specification comprises:
  accessing, by the computing node, a container group specification template that identifies the container image; and
  modifying the container group specification template to include a key of each taint and a value of each taint; and
causing, by the computing node and via the first container group specification, the container group to be deployed on each computing node in the set of computing nodes that has an associated taint.

2. The method of claim 1 wherein identifying the set of computing nodes that compose the container orchestration computing cluster comprises:
  issuing, by the computing node, a request, to a container orchestration system that implements the container orchestration computing cluster, that requests a list of computing nodes;
  receiving, by the computing node, a response that identifies each computing node in the set of computing nodes; and
  issuing, by the computing node for each respective computing node in the set of computing nodes, a request to the container orchestration system that requests a list of taints associated with the respective computing node.

3. The method of claim 2 further comprising:
  receiving, by the computing node from the container orchestration system, a response that identifies the list of taints for a respective computing node; and
  parsing the response that identifies the list of taints to identify, for each taint, the key of each taint and the value of each taint.

4. The method of claim 1 wherein causing, by the computing node, the container group to be deployed on each computing node in the set of computing nodes comprises:
  submitting, to a container orchestration system that implements the container orchestration computing cluster, for each respective computing node of the set of computing nodes, the first container group specification for deployment on the respective computing node.

5. The method of claim 4 further comprising:
  generating a daemonset that operates to submit, to the container orchestration system, for each respective computing node of the set of computing nodes, the first container group specification for deployment on the respective computing node.

6. The method of claim 1 wherein the container orchestration computing cluster is a Kubernetes container orchestration computing cluster.

7. The method of claim 1 further comprising:
  subsequent to causing the container group to be deployed on each computing node in the set of computing nodes, querying a container orchestration system that implements the container orchestration computing cluster for a list of container groups executing on each computing node of the set of computing nodes;
  receiving, by the computing node from the container orchestration system, a response that identifies the container groups executing on each computing node of the set of computing nodes; and
  determining, based on the response, that the container group is executing on each computing node of the set of computing nodes.

8. The method of claim 1 further comprising:
  generating a first list of all taints that prohibit the scheduling of or execution of a container group that is defined by a container group specification that does not meet a defined condition; and
  subsequently, iteratively:
    generating a second list of all taints that prohibit the scheduling of or execution of a container group that is defined by a container group specification that does not meet a defined condition;
    determining that the second list identifies a new taint not identified on the first list; and
    in response to determining that the second list identifies the new taint not identified on the first list, generating, by the computing node, a new container group specification that meets the condition defined by each taint on the second list.

9. A computing node, comprising:
  a memory; and
  a processor device coupled to the memory configured to:
    identify a set of computing nodes that compose a container orchestration computing cluster;
    identify a set of taints that are associated with the set of computing nodes, wherein each taint in the set of taints prohibits scheduling of a container group which is defined by a container group specification that does not meet a condition defined by the taint on a computing node associated with the taint;
    based on the set of taints, generate a first container group specification that meets the condition defined by each taint, wherein the first container group specification identifies a container image, wherein generating the first container group specification comprises:
      accessing a container group specification template that identifies the container image; and
      modifying the container group specification template to include a key of each taint and a value of each taint; and
    cause, via the first container group specification, the container group to be deployed on each computing node in the set of computing nodes that has an associated taint.

10. The computing node of claim 9 wherein to identify the set of computing nodes that compose the container orchestration computing cluster the processor device is further configured to:
  issue a request, to a container orchestration system that implements the container orchestration computing cluster, that requests a list of computing nodes;
  receive a response that identifies each computing node in the set of computing nodes; and
  issue, for each respective computing node in the set of computing nodes, a request to the container orchestration system that requests a list of taints associated with the respective computing node.

11. The computing node of claim 10 wherein the processor device is further configured to:
  receive, from the container orchestration system, a response that identifies the list of taints for a respective computing node; and
  parse the response that identifies the list of taints to identify, for each taint, the key of each taint and the value of each taint.

12. The computing node of claim 9 wherein to cause the container group to be deployed on each computing node in the set of computing nodes the processor device is further configured to:

submit, to a container orchestration system that implements the container orchestration computing cluster, for each respective computing node of the set of computing nodes, the first container group specification for deployment on the respective computing node.

13. The computing node of claim 9 wherein the processor device is further configured to:
generate a first list of all taints that prohibit the scheduling of or execution of a container group that is defined by a container group specification that does not meet a defined condition; and
subsequently, iteratively:
generate a second list of all taints that prohibit the scheduling of or execution of a container group that is defined by a container group specification that does not meet a defined condition;
determine that the second list identifies a new taint not identified on the first list; and
in response to determining that the second list identifies the new taint not identified on the first list, generate a new container group specification that meets the condition defined by each taint on the second list.

14. A non-transitory computer-readable storage medium that includes executable instructions configured to cause a processor device to:
identify a set of computing nodes that compose a container orchestration computing cluster;
identify a set of taints that are associated with the set of computing nodes, wherein each taint in the set of taints prohibits scheduling of a container group which is defined by a container group specification that does not meet a condition defined by the taint on a computing node associated with the taint;
based on the set of taints, generate a first container group specification that meets the condition defined by each taint, wherein the first container group specification identifies a container image, wherein generating the first container group specification comprises:
accessing a container group specification template that identifies the container image; and
modifying the container group specification template to include a key of each taint and a value of each taint; and
cause, via the first container group specification, the container group to be deployed on each computing node in the set of computing nodes that has an associated taint.

15. The non-transitory computer-readable storage medium of claim 14 wherein to identify the set of computing nodes that compose the container orchestration computing cluster the instructions are further configured to cause the processor device to:
issue a request, to a container orchestration system that implements the container orchestration computing cluster, that requests a list of computing nodes;
receive a response that identifies each computing node in the set of computing nodes; and
issue, for each respective computing node in the set of computing nodes, a request to the container orchestration system that requests a list of taints associated with the respective computing node.

16. The non-transitory computer-readable storage medium of claim 15 wherein the instructions are further configured to cause the processor device to:
receive, from the container orchestration system, a response that identifies the list of taints for a respective computing node; and
parse the response that identifies the list of taints to identify, for each taint, the key of each taint and the value of each taint.

17. The non-transitory computer-readable storage medium of claim 14 wherein the instructions are further configured to cause the processor device to:
generate a first list of all taints that prohibit the scheduling of or execution of a container group that is defined by a container group specification that does not meet a defined condition; and
subsequently, iteratively:
generate a second list of all taints that prohibit the scheduling of or execution of a container group that is defined by a container group specification that does not meet a defined condition;
determine that the second list identifies a new taint not identified on the first list; and
in response to determining that the second list identifies the new taint not identified on the first list, generate a new container group specification that meets the condition defined by each taint on the second list.

* * * * *